April 24, 1962 H. P. LUHN ET AL 3,031,075
GERMANIUM DICE GAUGING AND SORTING DEVICE
Filed Oct. 2, 1957 9 Sheets-Sheet 1

INVENTORS
HANS P. LUHN
HANS REICHLE
BY
ATTORNEY

April 24, 1962 H. P. LUHN ET AL 3,031,075
GERMANIUM DICE GAUGING AND SORTING DEVICE
Filed Oct. 2, 1957 9 Sheets-Sheet 2

April 24, 1962 H. P. LUHN ET AL 3,031,075
GERMANIUM DICE GAUGING AND SORTING DEVICE
Filed Oct. 2, 1957 9 Sheets-Sheet 5

April 24, 1962     H. P. LUHN ET AL     3,031,075
GERMANIUM DICE GAUGING AND SORTING DEVICE
Filed Oct. 2, 1957     9 Sheets-Sheet 6

April 24, 1962  H. P. LUHN ET AL  3,031,075
GERMANIUM DICE GAUGING AND SORTING DEVICE
Filed Oct. 2, 1957  9 Sheets-Sheet 7

April 24, 1962  H. P. LUHN ET AL  3,031,075
GERMANIUM DICE GAUGING AND SORTING DEVICE
Filed Oct. 2, 1957  9 Sheets-Sheet 8

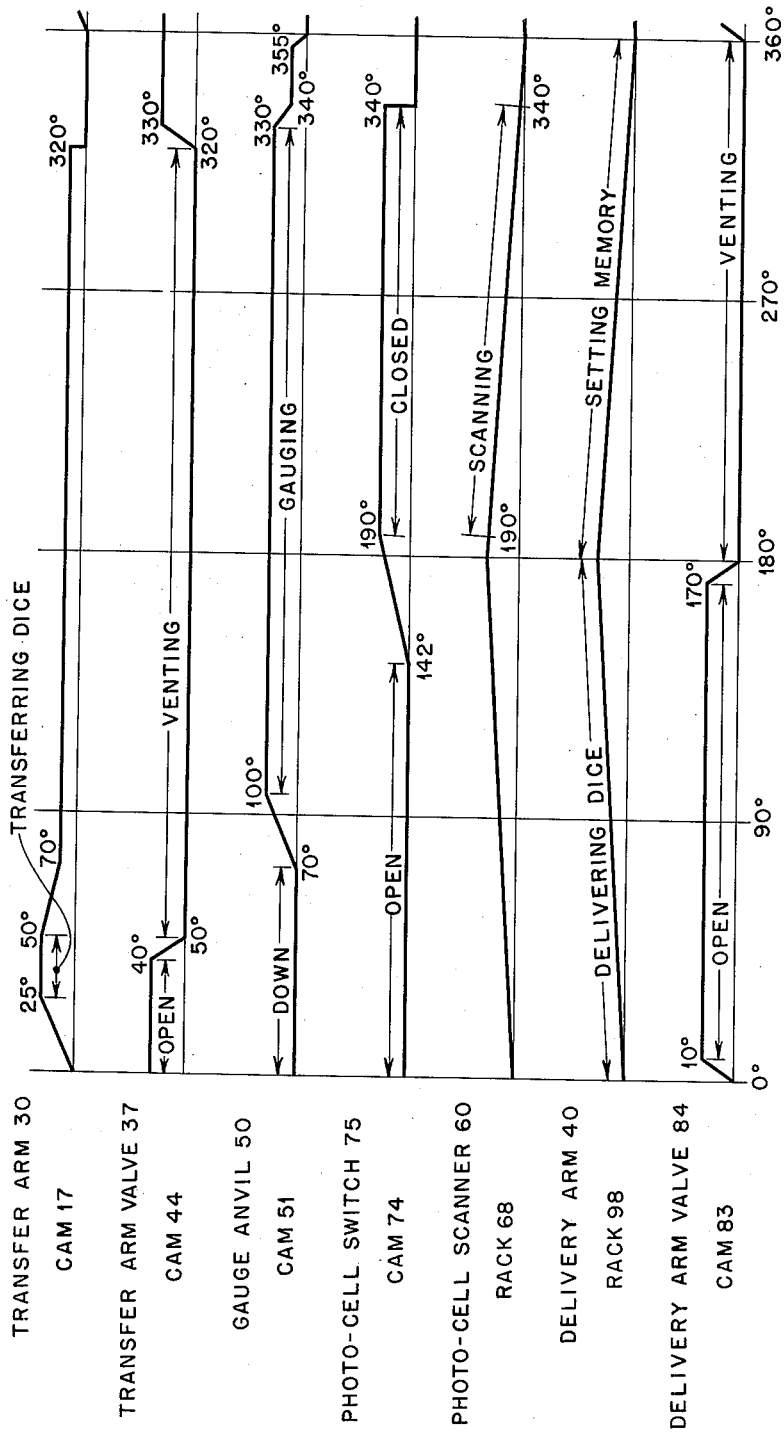

United States Patent Office 3,031,075
Patented Apr. 24, 1962

3,031,075
GERMANIUM DICE GAUGING AND SORTING DEVICE
Hans P. Luhn, Armonk, and Hans Reichle, Mahopac Falls, N.Y., assignors to International Business Machines Corporation, New York, N.Y., a corporation of New York
Filed Oct. 2, 1957, Ser. No. 687,766
3 Claims. (Cl. 209—82)

This invention relates to sorting machines and particularly to a machine for measuring and sorting small light weight objects.

This device is used for measuring and sorting dice such as those used in the manufacture of transistors. It is well known that the characteristics of a transistor vary in accord with many variables, one of which is the thickness of the germanium dice.

The dice or wafers of germanium are one-sixteenth of an inch square and vary in thickness from .0030 to .0020 of an inch. It is apparent that such a small object is extremely difficult to handle. Furthermore, the germanium crystal is brittle and continued handling of an object so thin and brittle results in considerable breakage.

It is, therefore, the principal object of this invention to provide a machine capable of measuring and assorting small articles of fragile material with a minimum of breakage.

Another object is to provide a device capable of measuring within close limits an article and then sorting the article according to the measurement.

A further object is to provide a mechanical memory for controlling such a machine.

Other objects of the invention will be pointed out in the following description and claims and illustrated in the accompanying drawings, which disclose, by way of example, the principle of the invention and the best mode, which has been contemplated, of applying that principle.

In the drawings:

FIGURE 15 is a timing diagram of the members of the device; and

FIGURE 16 is a schematic showing of the photocell scanning circuit.

The dice are placed in a round joggle plate which feeds them one at a time to a position in which they may be picked up for measuring. Since the joggle plate is not a part of the invention and is described fully in a patent to W. V. Spurlin, 2,696,292, no detailed description will be given here other than to state that the dice placed thereon are jogggled into a single line and fed singly to a point where a die can be picked up and transported by an arm having a vacuum finger thereon to an anvil of a gauging machine such as that described in the patent to E. W. Graham, 2,545,881. The anvil is pre-set to the minimum thickness of the die to be measured and in rising the anvil carries a die into contact with an arm of the device. This arm is raised a distance equal to the amount over the minimum thickness of the die measured. The movement of the arm is measured electrically and recorded on a meter. Secured to the needle shaft of the meter is a mirror. A beam of light from a lamp is passed through an optical system and reflected from the mirror and scanned by a photoelectric cell. The cell in turn controls the setting of a mechanical memory system in which a ratchet carrying a pin is stopped with reference to a control point or home position. The memory controls a transfer arm which carries the measured dice from the anvil to one of a group of pockets or receptacles in accordance with the reading of the meter.

Figure 1:
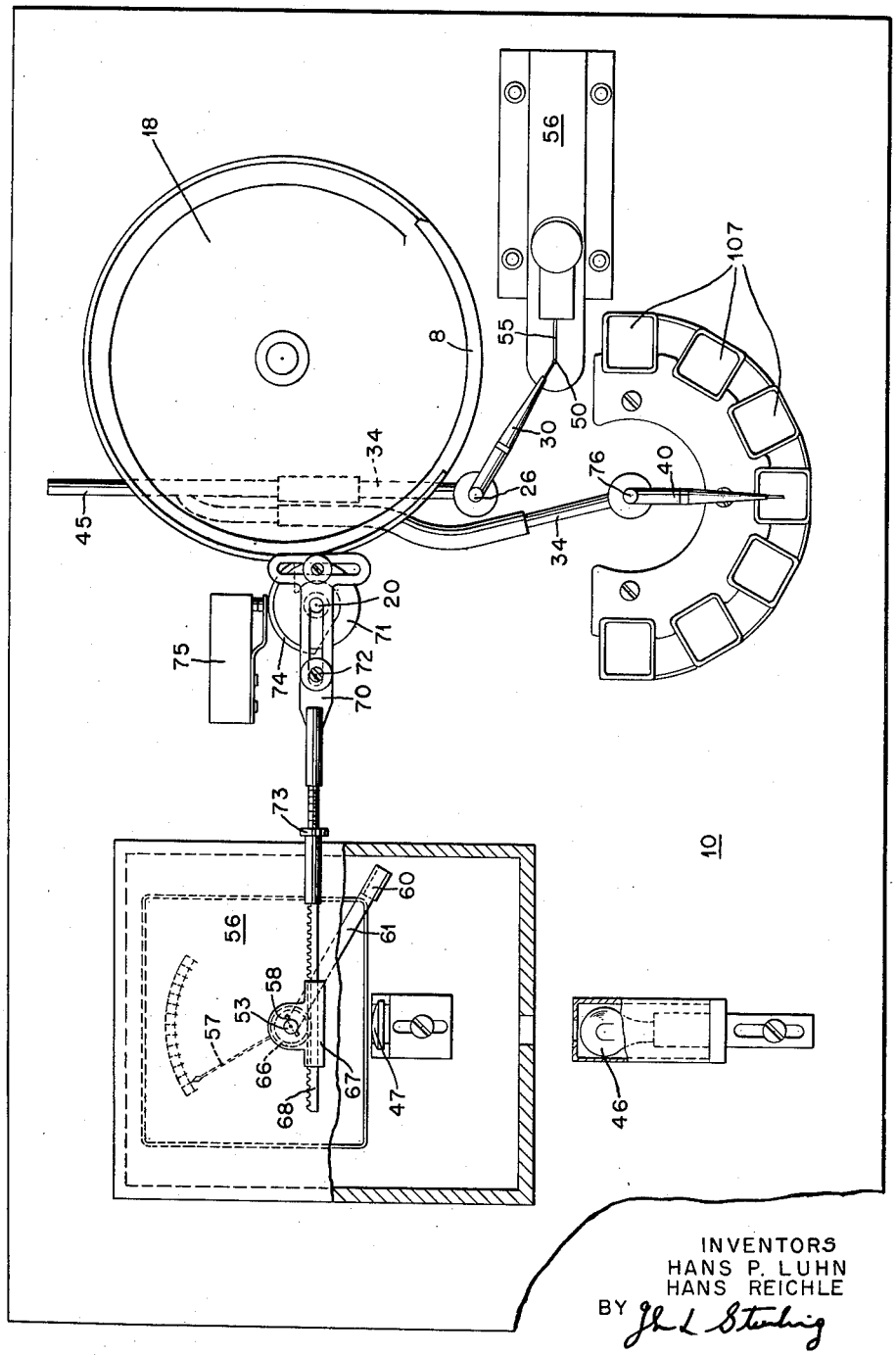
FIGURE 1 is a plan view of the invention.
Figure 2:
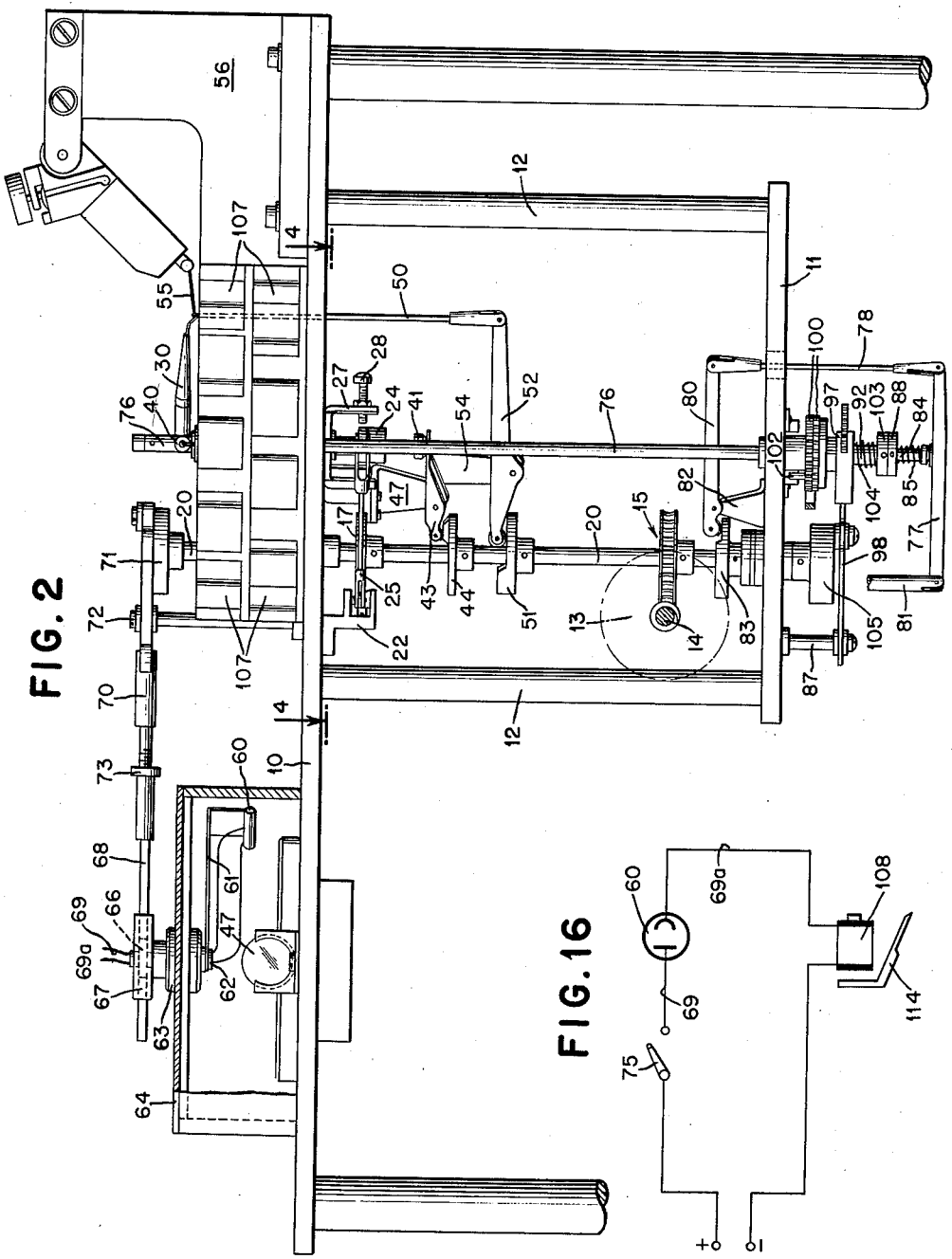
FIGURE 2 is a front elevation with a portion of the measuring device broken away.
Figure 3:
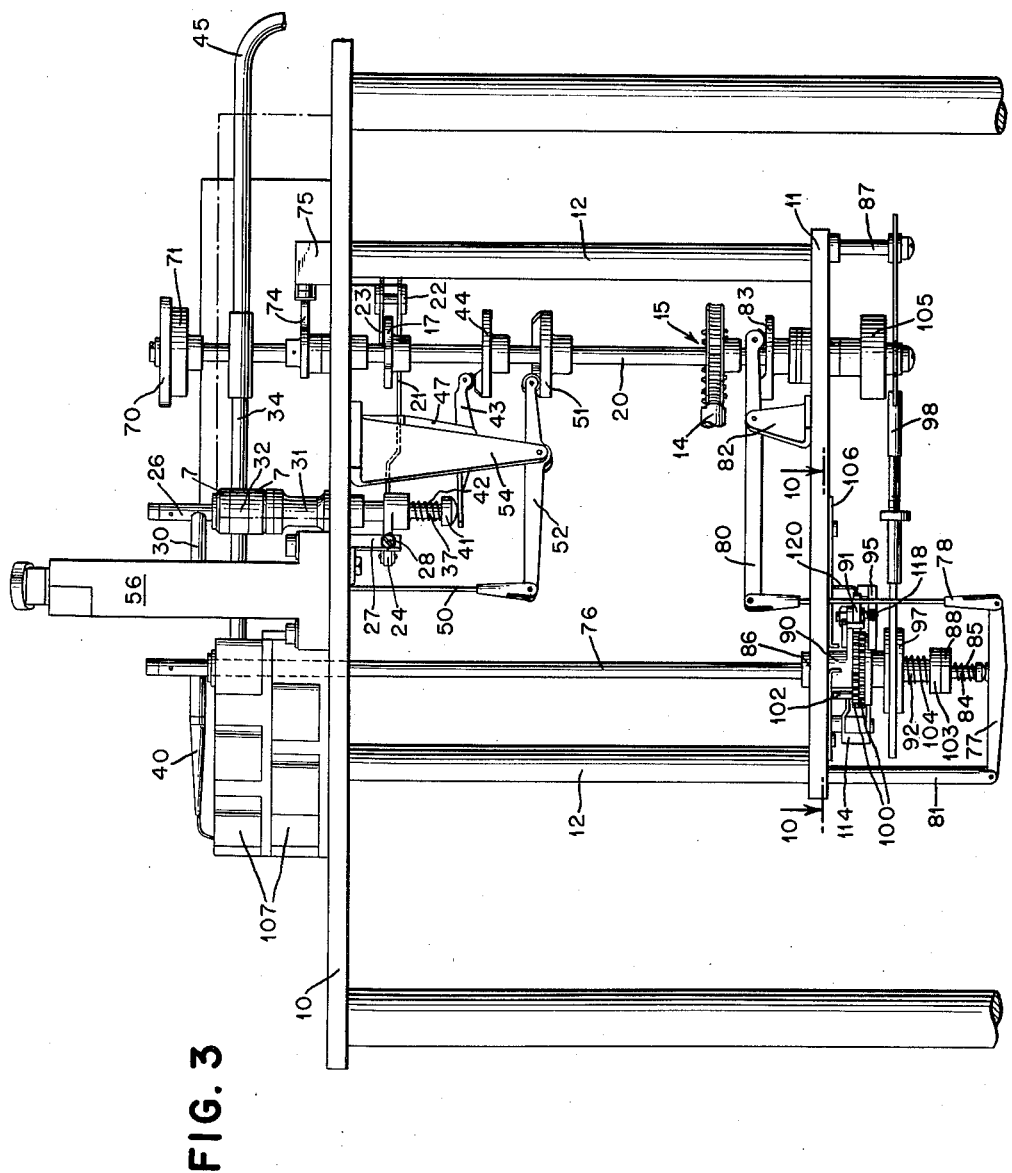
FIGURE 3 is a side elevation.

Referring to FIGURES 1, 2 and 3, the sorter is mounted on a table 10 carrying a subframe 11 secured to the underside of the table by rods 12. Mounted on the frame 11 is a motor 13 having a shaft 14 for driving the cam shaft 20 through worm drive 15. The shaft 20 is journalled in the table 10 and frame 11 and carries cams for controlling the valving of vacuum to the transfer and delivery arms, for oscillating the transfer arm and to raise and lower the anvil of the gauge. The shaft 20 also reciprocates a crank for operating the memory system as will be described hereinafter.

Figure 4:
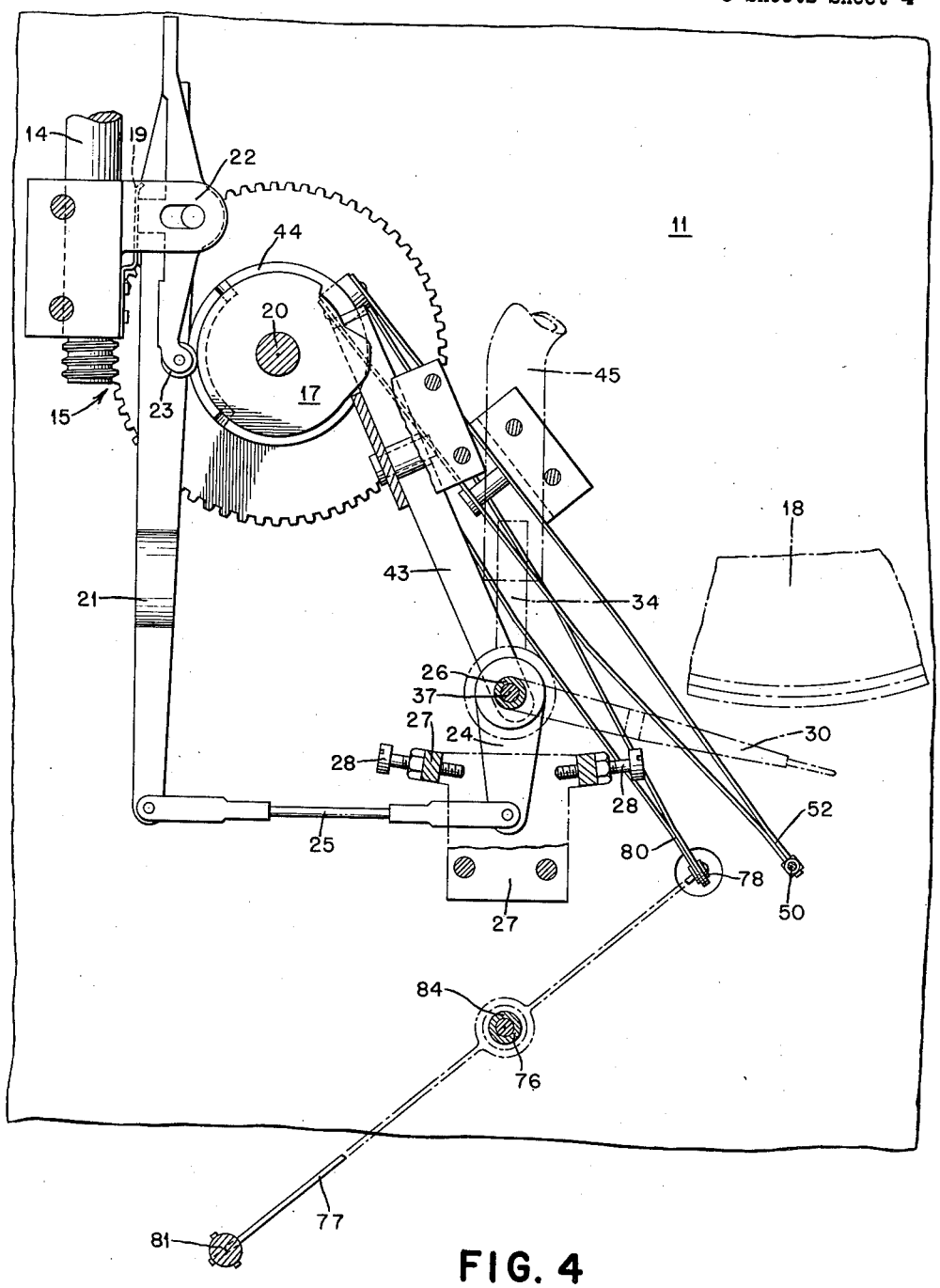
FIGURE 4 is an enlarged cross section taken along the line 4—4 of FIGURE 2.
Figure 5:
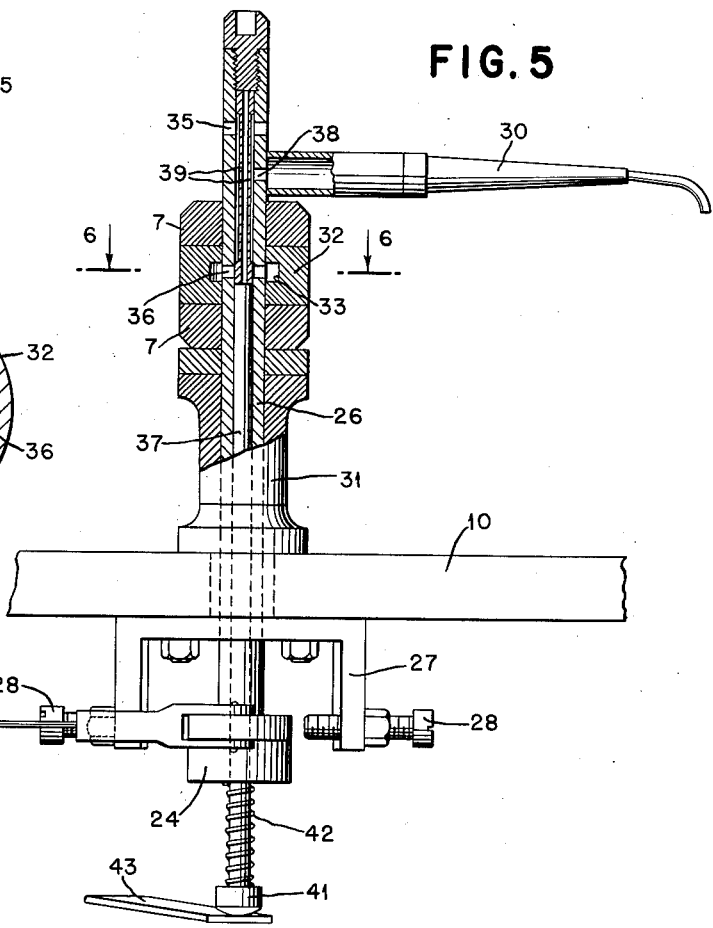
FIGURE 5 is an enlarged detail of a transport finger and its associated mechanism.
Figures 7, 12:
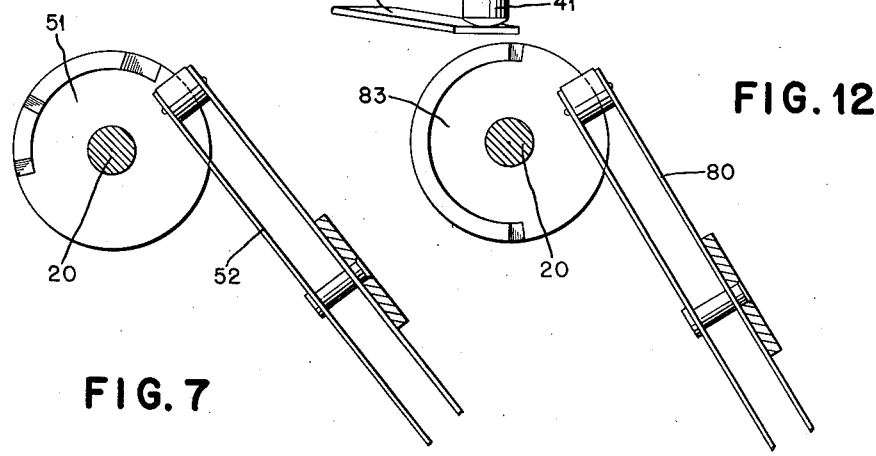
FIGURE 7 is an enlarged detail of the cam and associated follower for actuating the anvil of the gauge.
FIGURE 12 is an enlarged detail of the cam and follower for controlling the air valve for the transfer arm.

In FIGURE 4 it will be seen that a cam 17 secured to shaft 20 rocks an arm 21 pivoted in a bracket 22 and carrying cam follower 23. The arm 21 is spring biased by a double acting spring 19 fastened to the bracket and bearing against follower 23. The free end of arm 21 is connected to an arm 24 by a link 25 which arm is in turn secured to a hollow shaft 26 by any well known means. Secured to the underside of the table 10 is a bracket 27 formed as shown in FIGURE 5, having two adjustable stops 28 for limiting the oscillation of the arm 24 and consequently the transfer arm 30 which is also secured by soldering or other means to the upper portion of the shaft 26. A slot 16 is provided in the bracket 22 to permit movement of the trunnion on follower 23 should arm 24 limit on screw 28 before the high spot of cam 17 is reached.

Figure 6:
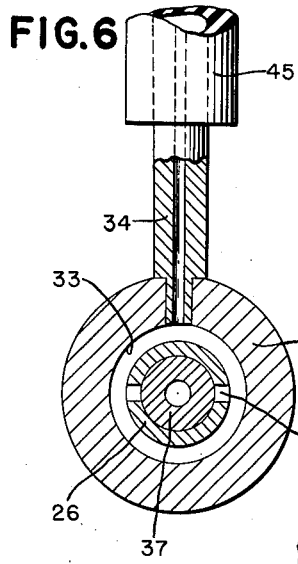
FIGURE 6 is a detail cross section along line 6—6 of FIGURE 5.

It will be noted that the assembly and operation of the transfer arm 30 and a delivery arm 40 are similar except as to location and dimension. In view of this only the transfer arm 30 will be described in detail. A hollow shaft 26, FIGURES 5 and 6, is mounted in a bushing 31 secured to the table 10 by any well known means such, for example, as a pressed fit. Secured to the shaft by any well known means such as welding is an arm 30 having the free end thereof formed with a downwardly curved nozzle. Mounted on the shaft 26 free to turn between two packing rings or set screw collars 7 is a cylindrical sleeve 32 formed with an internal groove 33 communicating with a vacuum hose tube connector 34 (FIG. 6) secured in the sleeve. The shaft 26 is provided with exhaust ports 35 and intake ports 36. The exhaust port communicating with the air and the intake port being aligned with the groove in the sleeve 32. A supply port 38 opens into the nozzle of the transfer arm 30. Located in the hollow shaft 26 is a cam operated valve stem 37 having a reduced valving portion 39 joining the intake and supply ports 36 and 38 in the down position of the cam 44, and the supply and exhaust ports 38 and 35 in the up position as shown in FIG. 5. The lower end of the valve stem 37 is provided with an adjustable head 41 forming a shoulder for a spring 42 which bears against the hub of arm 24 thus biasing the stem downward into contact with a cam follower 43 (FIGURE 3) cooperating with a cam 44 on the main shaft 20. The follower 43 is pivotally mounted in bracket 47 secured to the table. In the position shown in FIGURE 5 the ports 35 and 38 vent the finger of transfer arm 30 to the atmosphere. When the follower 43 rides on a high spot of cam 44 the spring 42 forces stem 37 to follow arm 43 and connect ports 36 and 38 to groove 33 and thereby to connector 34 and through tubing 45 to the vacuum pump (not shown). The contour of the cam 44 is such that vacuum is maintained on the transfer arm 30 only during the time the arm is transferring a die 8 from the joggle plate 18 to an anvil 50. The vacuum is cut off immediately the die is over the anvil. The groove 33 insures communication with port 36 in all positions of the transfer arm 30.

As the arm 30 picks up a die from the joggle plate and carries it to the anvil 50 a cam 51 (FIGURE 2) rocks cam follower 52 to raise the anvil. The follower 52 is pivotally mounted on a bracket 54 secured to the underside of table 10. The cam 51 is so formed as to raise the anvil, dwell while the arm 30 drops the die and starts to return to normal and then raise the anvil to bring the die into contact with a finger 55 of a gauge 56.

Figure 8:
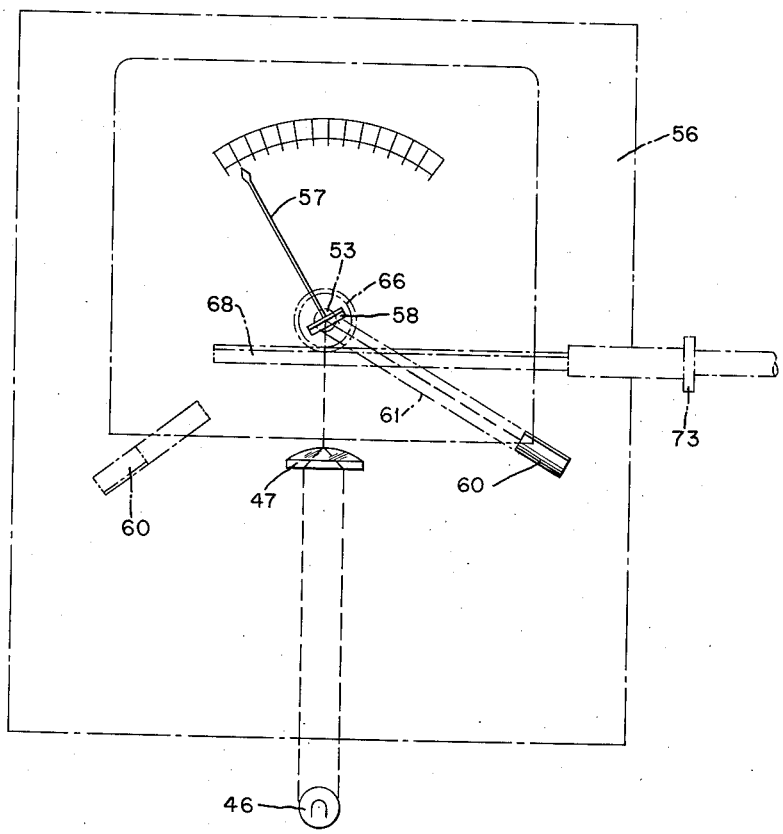
FIGURE 8 shows the scale of the gauge and the associated photoelectric sensing device.
Figure 9:
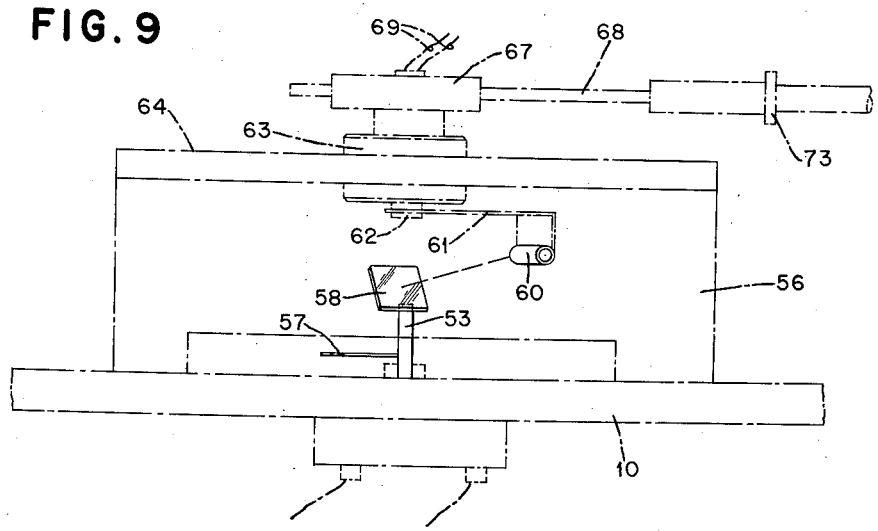
FIGURE 9 is a side elevation of FIGURE 8.

As described in the Patent 2,545,881, the finger 55 is a pivotally mounted pole piece of a transducer and acts in a hollow exciter coil. This coil with other circuitry sets up a frequency change which controls a circuit to move a needle 57 over the scale of gauge 56 to register the thickness of a die. Secured to the needle shaft 53 (FIGURES 8 and 9) is a mirror 58 which oscillates in a beam of light projected from the lamp 46 by a lens 47. Upon settling, the position of the needle 57 is detected by a photocell 60 mounted on an arm 61 which is secured to a hollow stub shaft 62 mounted in a bearing 63 secured to a cover 64 for the meter. Secured to the shaft 62 (FIGURE 2) is a pinion 66 positioned in a rack bearing support 67. The support carries the free end of a rack 68 which meshes with and drives the pinion to oscillate the photocell through a scanning motion. Wires 69 and 69a for the photocell are carried along arm 61 and through hollow shaft 62. The rack is secured in the end of a yoke 70 (FIGURE 1) which is driven by a crank 71 secured to the main drive shaft 20. The yoke 70 is supported and guided by a post 72 secured in the table 10. An adjustment screw 73 is provided between the rack and the yoke to permit adjustment of the angular relationship between the crank 71 and photocell arm 61. Secured to the main shaft 20 directly below the crank 71 is a cam 74 for controlling the photocell circuit by means of a microswitch 75 or similar contact for holding the photocell circuit open except during the scanning cycle. Since the gauge anvil is fully up at about 100° (FIGURE 15) the needle is well settled by about 190° at which time the photocell circuit is closed. The cell begins to search for the light beam and, when found, will set the memory device as will be described later.

Figure 10:
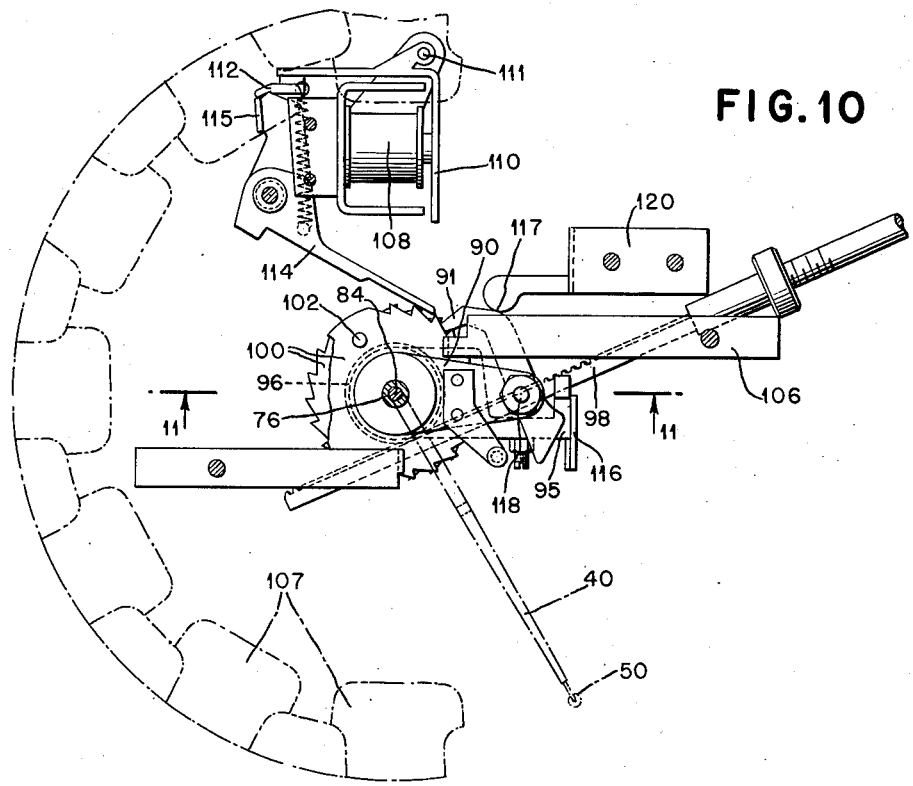
FIGURE 10 is a plan view of the mechanical memory and is a cross section taken along line 10—10 of FIGURE 3.
Figure 11:
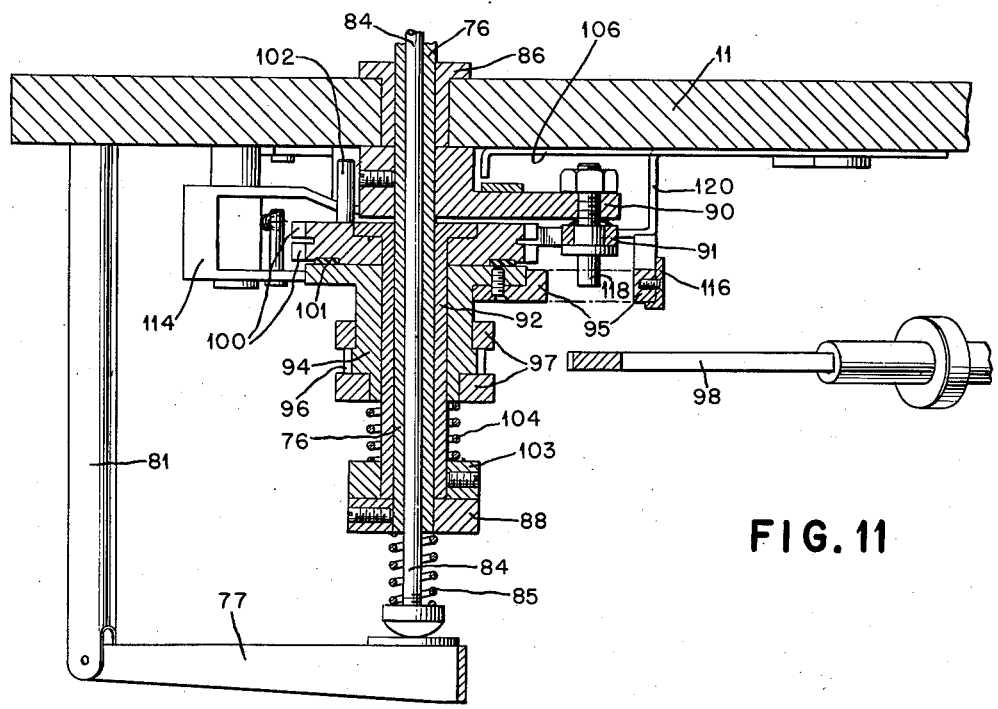
FIGURE 11 is a cross section taken along line 11—11 of FIGURE 10.

The memory device comprises a hollow shaft 76 (FIGURES 3, 10 and 11) similar to shaft 26, having a delivery arm 40 secured near its top. Suitable valving means similar to those described in connection with the transfer arm 30 are provided. The valving is effected as before by a cam actuated arm 77 pivotally mounted on a post 81 secured to the underside of subframe 11. The arm 77 is connected by a link 78 to a cam follower 80 which is fulcrumed on a bracket 82 and bears on cam 83 secured to main shaft 20. The arm 77 is provided with a plate bearing on the end of a valve stem 84, the stem being spring biased by a spring 85 to maintain this contact.

Figure 13:
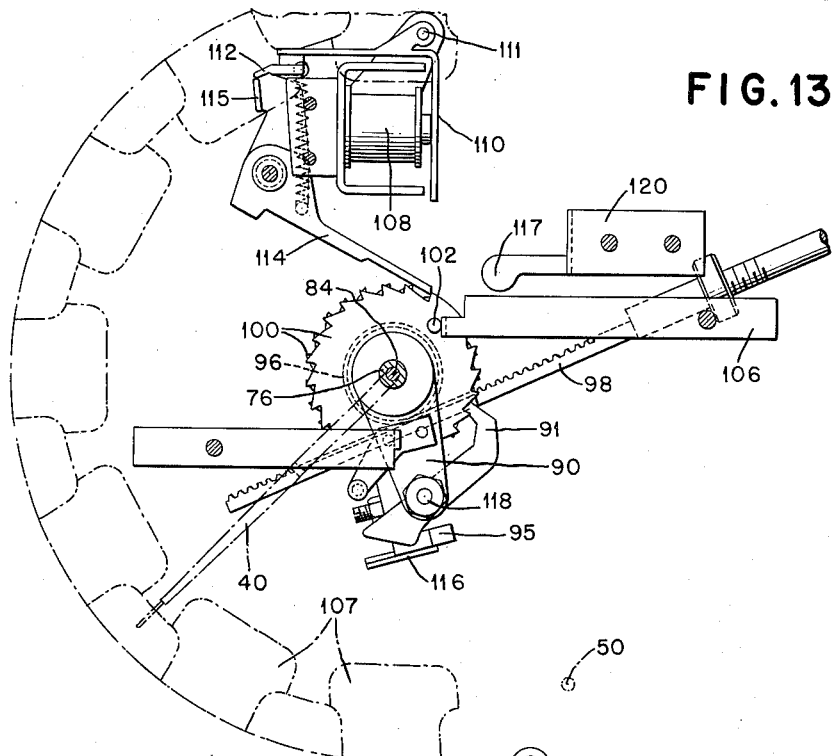
FIGURES 13 and 14 are positional views of the memory similar to FIGURE 10.

Secured to the bottom of shaft 76 is a collar 88, which acts as a base for the memory device. The shaft 76 passes through a bushing 86 in the subframe 11 and immediately below the frame is an arm 90 which is secured to the shaft 76 and carries a pawl 91, the shape of which is best seen in FIGURE 13. Rotatably mounted on the shaft 76 is a sleeve 92, the upper end of which is flanged. Freely mounted on the sleeve 92 is a second sleeve 94 to which is secured an arm 95 and on which is formed a pinion 96. Positioned above and below the pinion are the two halves of a bearing 97 for rack 98. Rack 98 is similar in all respects to the rack 68 described above. Mounted freely on sleeve 92 between the collar thereof and the flange of sleeve 94 are two ratchets having their teeth cut in opposite directions and fastened together to form one ratchet 100. Positioned between the flange of sleeve 94 and the lower ratchet 100 is a friction ring 101 adapted to effect a drive between the pinion driven sleeve 94 and the ratchet. Secured in and extending upwardly from the ratchet 100 is a limit pin 102. Secured to the bottom of sleeve 92 is a collar 103, between which and the bottom of the sleeve 94 is a spring 104 which exerts the necessary pressure to create a friction drive between the pinion 94 and the ratchet 100.

The rack 98 is driven by a crank drive 105 similar to that for the photocell scanning arm 61. The crank 105 is secured to the bottom of drive shaft 20 and acts through a pin and slot connection to oscillate the rack 98. The rack is guided and supported by a post 87 secured in subframe 11.

In operation the rack 98 moving from right to left rotates pinion 96 clockwise (FIGURE 10) during which time a measured die is delivered to its proper receptacle or pocket 107. The pinion being formed on sleeve 94 rotates it and the arm 95 which is secured thereto. The friction washer 101 picks up the ratchet 100, and the pawl 91, which is in engagement with the teeth of ratchet 100, drives arm 90 and its associated shaft 76. The ratchet unit will continue to rotate until the limit pin 102 (FIGURE 13) reaches a stop 106 secured to the underside of the subframe 11. At this point the delivery arm 40 on the upper end of shaft 76 is over the previously selected one of a group of pockets 107 located in an area on table 10 as shown in FIGURE 1. The rack 98 continues to the end of its stroke, which is determined by crank 105 (FIGURE 3), and the heel of arm 95 disengages the pawl 91 from the ratchet 100. At the end of the stroke a shoulder 116 (FIGURE 14) on the arm 95 relatches pawl 114 with latch 112 as described. The cam 83 through arm 80, link 78, and arm 77 now raises valve stem 84 to open the valve to the atmosphere permitting the die to drop in the previously selected pocket. The memory unit will now begin to turn in a counterclockwise direction, during which time the selection for the following pocket is made.

Figure 14:
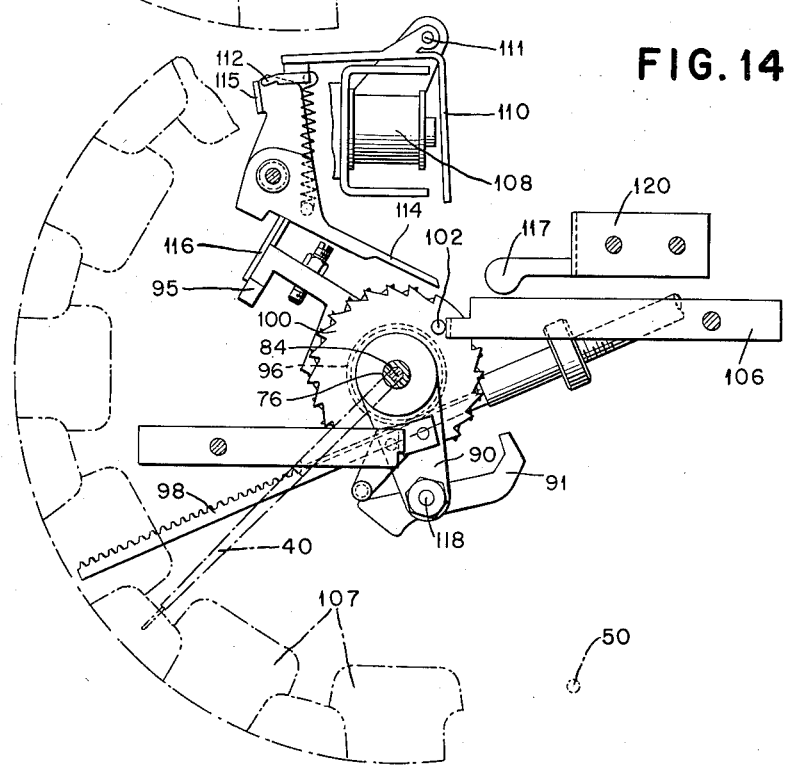

The photocell 60 senses the location of the gauge needle 57 and provides a signal of sufficient current in a circuit (FIG. 16) to actuate a solenoid 108 fastened to the underside of table 10. The solenoid has an L-shaped armature 110 pivoted at 111 and carries a spring biased latch 112 on the horizontal arm thereof. The latch 112 holds a ratchet pawl 114 out of engagement with the ratchet 100 as shown in FIGURE 14 until the above signal is received from the photocell, at which time the armature 110 rocks the latch 112 out from behind a lug 115 on pawl 114 permitting the pawl to engage the teeth of the ratchet 100 and prevent its rotation in a counterclockwise direction, i.e., this retains the angular displacement of pin 102 from the home position at 106, see FIGURE 13. This determines the distance the delivery arm must travel on the return cycle to carry the just measured die to the selected receptacle. During this return cycle or clockwise rotation of the ratchet, the pawl 114 idles over the teeth of the ratchet. When the rack starts from left to right driving the pinion 96 and arm 95, arm 95, through an adjustable pin 118 in arm 90 which is also the pivot for pawl 91, engages the arm and pawl wherever they may be and rotates them counterclockwise. Pawl 91 is out of engagement with ratchet 100 which is now driven by the friction member 101 until a signal from the photocell 60, which has been scanning the new setting of the gauge, actuates the magnet 108 releasing the ratchet pawl 114 and prevents the ratchet from further movement. The arms 95 and 90 continue to rotate until the nose of the pawl 91 contacts a cam surface 117 of a bracket 120 secured to the underside of frame 11. The cam 117 rocks pawl 91 into contact with the teeth of the ratchet. At this point the transfer arm 40 will be in position to pick the die just measured from the anvil 50. This point is determined by the relationship between cam 117 and the limit screw 118. The clockwise cycle described above is then repeated until pin 102 again contacts stop 106 at which time the die is dropped in one of the preselected containers or pockets 107.

Referring to the timing diagram (FIGURE 15) it will be seen that at about 25° the transfer arm 30 picks a die from the joggle plate 18. During a dwell of approximately 25° the valve 37 associated with transfer arm 30 is opened to the atmosphere dropping the die into the anvil at about 40°. In the meantime, at about 10° the vacuum valve 84, associated with delivery arm 40, opens admitting a vacuum which picks the die, which has been measured during the preceding cycle, from the anvil and from about 20° to 80° the die is carried to a position over a preselected pocket 107 and at about 170° the valve 84 is opened to the atmosphere dropping the die in the selected pocket.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a measuring and sorting device, a supply means for presenting an article at a predetermined point, delivery means, a measuring device, said delivery means effecting delivery of said article from said point to said measuring device, scanning means for reading said measuring means, a transfer means, a plurality of containers and electro-mechanical memory means actuated by said scanning means to stop said transfer means while carrying said article from said measuring means to a predetermined container.

2. The device described in claim 1, said memory means comprising a fixed member, a ratchet member, a pawl associated therewith, a stop on said ratchet and said scanning means actuating said pawl to position said stop a predetermined distance from said fixed member whereby said stop upon being rotated to said fixed member will position said transfer means over a predetermined container.

3. In a device of the character described, a joggle plate for delivering a series of articles seriatim to a predetermined point, a delivery arm, an anvil of a measuring device, vacuum means in said delivery arm whereby said arm delivers one of said articles to said anvil, a mirror positioned by said measuring device, a light source adapted to illuminate said mirror, a photocell for reading the position of said mirror to control a memory device, said memory device comprising a driver, a fixed member, a ratchet driven by said driver, said ratchet having a stop thereon, a stop pawl associated with said ratchet and controlled by said photocell to position said stop a predetermined distance from said fixed member, said ratchet controlling a transfer arm whereby said article is transferred from said anvil to one of a group of containers.

References Cited in the file of this patent
UNITED STATES PATENTS

| | | |
|---|---|---|
| 735,291 | Pidgin | Aug. 4, 1903 |
| 1,281,639 | Nichols | Oct. 15, 1918 |
| 2,044,981 | Guttman | June 23, 1936 |
| 2,319,833 | Troy | May 25, 1943 |
| 2,344,596 | Carmina | Mar. 21, 1944 |
| 2,504,505 | De Tar | Apr. 18, 1950 |
| 2,591,868 | Puster et al. | Apr. 8, 1952 |
| 2,769,143 | Banzhof et al. | Oct. 30, 1956 |